United States Patent [19]

Snopko

[11] 4,338,492
[45] Jul. 6, 1982

[54] TELEVISION RECEIVER WITH TWO-WAY TELEPHONE CONVERSATION CAPABILITY

[75] Inventor: Paul A. Snopko, Chicago, Ill.

[73] Assignee: Zenith Radio Corporation, Glenview, Ill.

[21] Appl. No.: 109,424

[22] Filed: Jan. 2, 1980

[51] Int. Cl.³ .................... H04M 11/00; H04M 11/08
[52] U.S. Cl. .................................... 179/2 TV; 358/85; 455/344
[58] Field of Search ........... 179/2 EA, 2 TV; 358/85; 455/344

[56] References Cited

U.S. PATENT DOCUMENTS

| | | | |
|---|---|---|---|
| 2,766,378 | 10/1956 | Sundin et al. | 179/1 VC |
| 3,492,418 | 1/1970 | Tanner | 179/2 TV |
| 3,567,848 | 3/1971 | Thies et al. | 179/2 TV |
| 3,668,312 | 6/1972 | Yamamoto et al. | 179/2 TV |
| 3,746,780 | 7/1973 | Stetten et al. | 179/2 TV |
| 3,816,662 | 6/1974 | Shaver et al. | 179/2 TV |

FOREIGN PATENT DOCUMENTS 2014322 9/1971 Fed. Rep. of Germany ... 179/2 TV
2002995 2/1979 United Kingdom .

OTHER PUBLICATIONS

Philips Telecommunication Review, vol. 32, No. 1, pp. 11–24, Apr. 1974, Loon et al.
Television, vol. 16, No. 2, pp. 6–10, Mar.–Apr. 1976, Pearson et al.
Heath Company–Assembly and Operation of the Telephone Amplifier with Dialer Model GD-1162, ©1975.

Primary Examiner—Stuart N. Hecker
Attorney, Agent, or Firm—Ralph E. Clarke, Jr.

[57] ABSTRACT

A television receiver is disclosed comprising a cabinet which houses a television system having telephone network access means. The television receiver provides both for presentation of television programs and for conversing through the talk channel and listen channel of an associated telephone network while viewing a television picture. The receiver has at least one function control means including operational mode selection means for providing a television program mode, and alternately, a two-way telephone conversation with-television-picture mode. When the presence of a ringer signal from the telephone network is indicated, the television receiver user can activate the two-way telephone conversation mode and conduct a two-way conversation with the telephone caller through the television receiver while viewing a television picture. Upon termination of the conversation, the television receiver user can restore the television program mode.

2 Claims, 3 Drawing Figures

TELEVISION RECEIVER WITH TWO-WAY TELEPHONE CONVERSATION CAPABILITY

BACKGROUND OF THE INVENTION AND PRIOR ART DISCLOSURES

This invention relates to television systems and is particularly concerned with means for enhancing the utility of the standard television receiver.

Numerous systems and techniques have been proposed for utilizing the display and monitoring capabilities of the standard television broadcast receiver, in addition to its well-known function of receiving commercial and public service television programs. The enhancement of the utility of the television receiver is attractive in the many potential benefits offered. The television receiver is inherently capable of conveying complex video and audio information via a single coaxial conductor which may be attached to a dedicated cable system and/or to a separate antenna for receiving over-the-air broadcasts. A major attraction of the television receiver is its ubiquity; there are currently more than 90 million television receivers in operation in the United States alone, with the number constantly increasing.

Systems and techniques proposed for increasing the utility of the television receiver, represented by various examples of letters patent, include the use of television receivers with information banks and intercom systems, for entrance monitoring, and in conjunction with telephone systems.

For example, patent GB No. 2 002 995A Klein et al., discloses a method and apparatus that provides two modes of operation with respect to a television set, according to applicant's understanding. A first mode provides for communication with other subscribers to a screen text information service (assumed to be Teletext, Viewdata, or the like) by means of a conventional loudspeaker phone separate from the television receiver. A second mode provides for connecting a television set with the screen text information bank. It is understood that subscribers to the service can contact and instruct the service as to what type of text information is desired by means of a remote control key pad, and receive programmed service announcements through the television loud speaker.

U.S. Pat. No. 3,668,312 to Yamamoto et al. discloses a "television telephone" system having means for sending back an indication signal from an information; receiving party of a television telephone system to an information-transmitting party of the system. A light pen is used which detects the light of the raster of the transmitted information picture so as to indicate a command of the receiving party to the information transmitting party. The system is said to be applicable to existing television telephone subscribers by a minor modification and allegedly improves the utility of the "television telephone" system for information exchanging.

Shaver et al in U.S. Pat. No. 3,816,662 discloses a combination telephone and video communication system for selectively enabling, from a given location in which a video terminal is provided, another video terminal at a desired one of a plurality of remote locations. Specifically, the invention is concerned with an enabling arrangement in conjunction with intercom and door-answering systems for apartment or the like buildings. The purpose is to make it possible for the tenant in an apartment to converse with and to see a visitor calling from an entrance of the building.

In Stetten—U.S. Pat. No. 3,746,780—means are disclosed which permit individual ones of many television receivers to display on their screens individually adapted, and different, displays from a commonly received, sequential video television signal. The telephone is used to dial a television display system which has been subscribed to which provides information such as weather forecasts. The selection for display at particular display devices is on the basis of information data incorporated within the video signals. Video recorders are described as being adapted to record select portions of commercial television-type video signals for maintaining the image displayed on associated television receivers.

Tanner—U.S. Pat. No. 3,492,418 discloses a signal transmission system using DC control signals to selectively operate a television receiver as a monitor and to control an intercom system. The system is said to include a camera with one section of an audio intercom nearby. A television receiver and another section of the intercom are located at some distance from the camera. A switch near the receiver has a first position to connect the antenna to the receiver and to simultaneously turn off the camera and the intercom. A second section disconnects the antenna, connects the camera to the receiver, and turns the camera and intercom off. A cable connecting the camera to the receiver has a single shielded conductor for transmission of the camera signal, the audio intercom signal and the power on-off control.

However, despite these and many other proposals for the greater utilization of the capabilities of the television receiver, innumerable possibilities for greater utilization of the system remain as yet untapped.

OBJECTS OF THE INVENTION

It is a general object to provide for the increase in the usefulness of a television receiver beyond its present major limited application as a passive viewing system of television programs.

It is a specific object of the invention to provide for a television receiver capability that, when the telephone rings, or when the viewer wishes to place a telephone call, the television receiver user can conduct a two-way telephone conversation through the television receiver while watching a television picture.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements, and in which:

Figure 3:
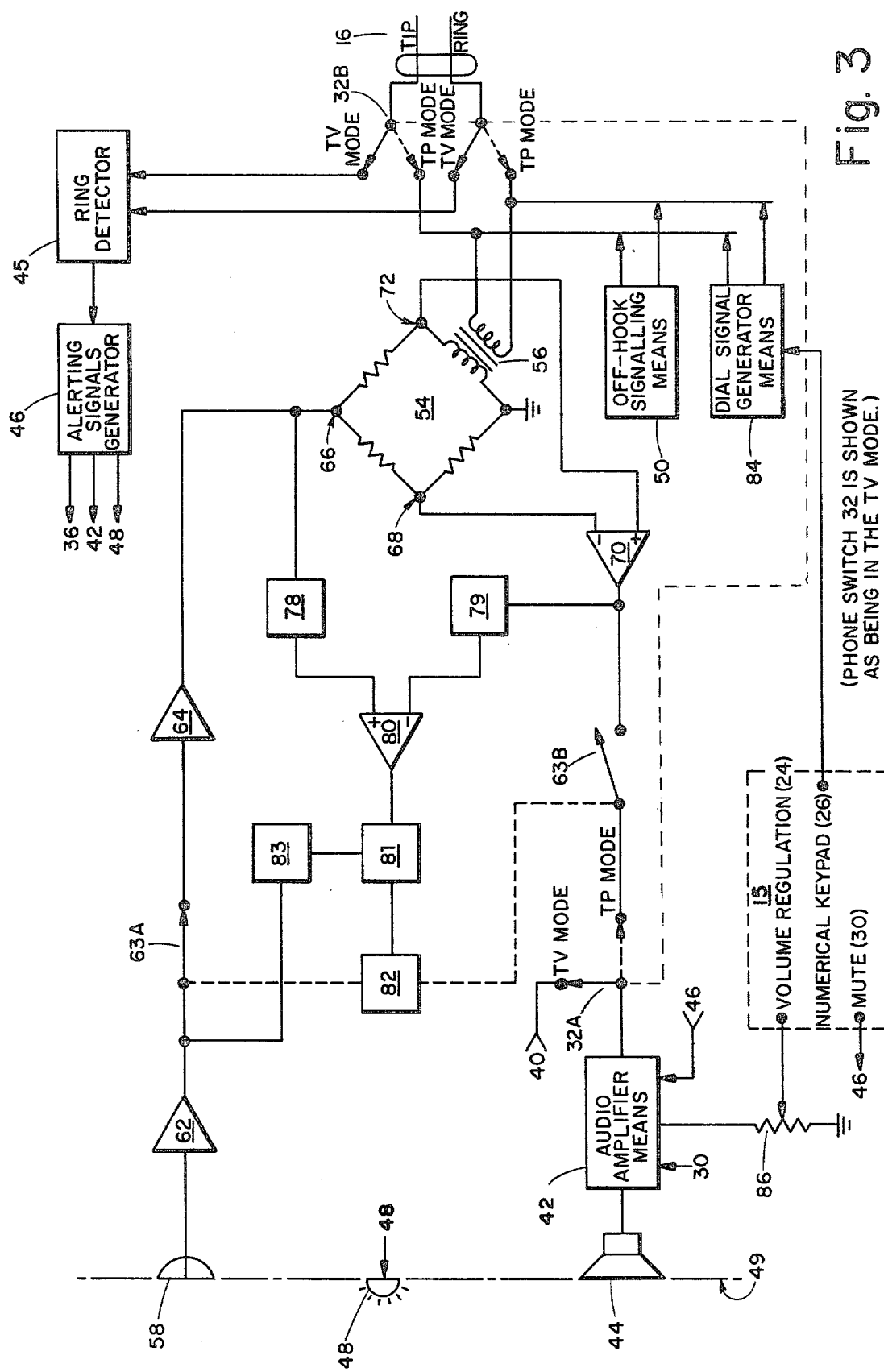

and,

FIG. 3 is a diagram partially schematic and partially in block setting forth in greater detail a means of operation according to the invention.

DESCRIPTION OF THE PREFERRED EMBODIMENTS

Figure 1:
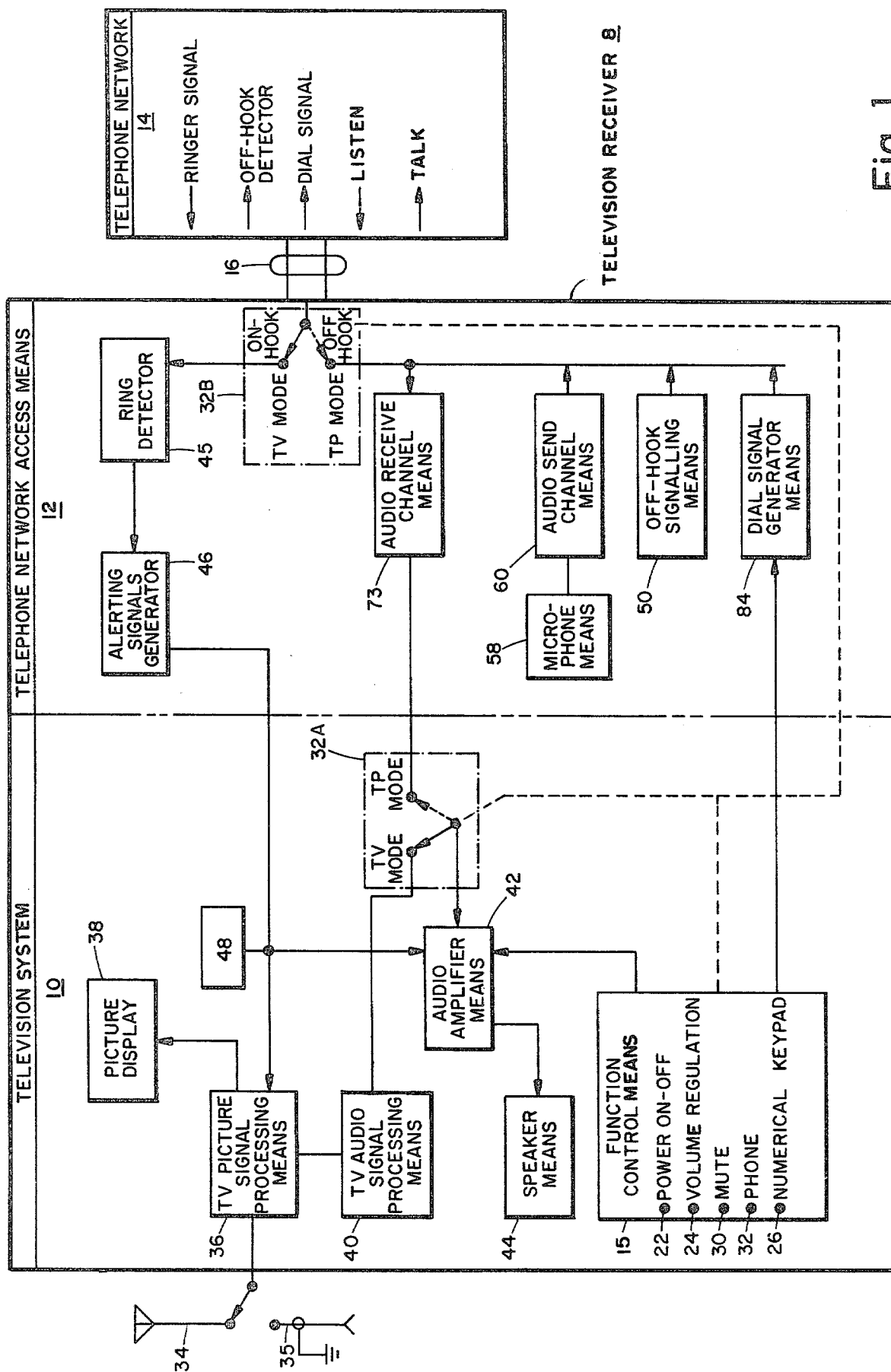
FIG. 1 is a block diagram of a preferred embodiment of the novel means according to the invention in conjunction with a telephone network.

FIG. 1 is a block diagram of a television receiver 8 comprising a cabinet which houses a television system 10 and a telephone network access means 12. Television receiver 8 provides both for presentation of television programs and for conversing through the talk channel and listen channels of the associated telephone network 14 while watching a television picture. Television receiver 8 has at least one function control means including operational mode selection means for providing a television program mode exclusively, and alternately, a two-way telephone conversation mode with a viewable television picture. The television program mode is abbreviated "TV mode" in the following, and the two-way-telephone-conversational-mode with-television-picture is abbreviated "TP" mode. The function control means 15 may be located on a control panel of the television system 10, on a hand-held remote unit, or on both.

It is to be noted that the components listed in the section designated as television system 10 do not constitute the entirety of a standard television system, but only those components which interface according to the principles of the invention with telephone network access means 12 to provide a two-way-conversation-with-television-picture mode. Television receiver 8 is shown as being connected to a telephone network 14 by means of the familiar two-wire tip and ring connection 16. The telephonic functions of telephone network 14 of relevance to television receiver 8 according to the invention, and the direction of each function; that is, whether into or out of the television receiver 8 are listed as comprising ringer signal, off-hook detector, dial signal, listen, and send, with the "in or out" directions indicated by the associated arrows.

Figure 2:
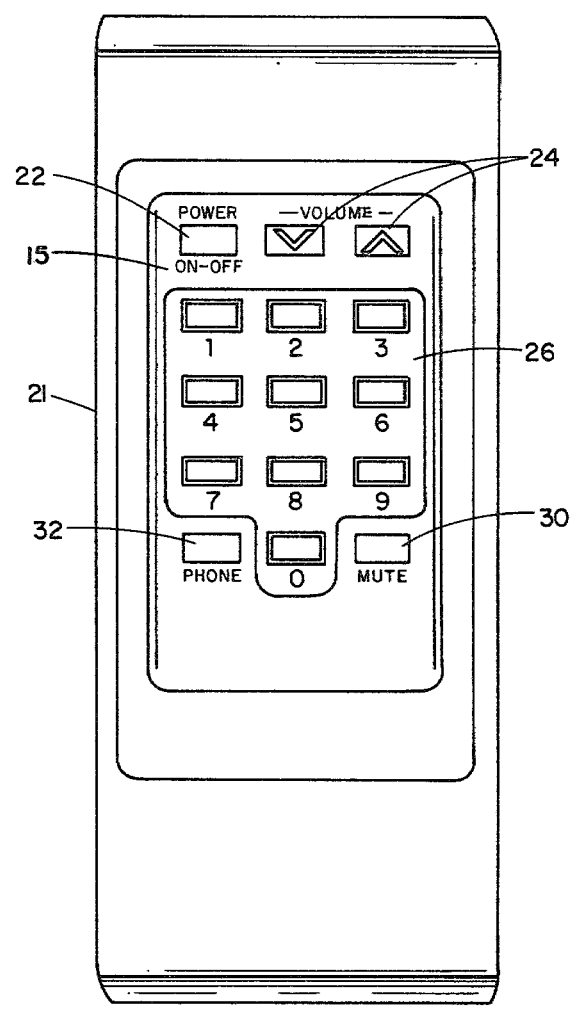
FIG. 2 is a plan view of an embodiment providing for control of the functions of the television receiver with telephone capabilities according to the principles of the invention.

With additional reference now to FIG. 2, there is shown a function control means 15 which may be either a discrete hand-held unit embodied in a convenient housing 21 as depicted, or a function control means 15 without housing 21, mounted on a front panel of television receiver 8. As has been noted, either or both may be used. All control buttons shown are utilized for control of both the television system 10 and the telephone network access means 12, as will be shown. The appearance of the function control means 15 as depicted by FIG. 2 is for example only, and is not intended to be in any way limiting with regard to aspects such as the type of control or their number, or aspects of layout or design. For example, the controls 22–32 depicted may be of the push-button switching type, or capacity contact type.

POWER ON-OFF switch 22 provides for on-off control of television receiver while VOLUME regulating means 24 provides for regulating the volume of the audio amplifier means of the television system 10 as well as the volume of a two-way telephone conversation conducted through television receiver 8. The direction of the arrows on the two volume controls 24 indicates that by depressing a particular button, the volume will go either up or down.

The numerical keypad 26 having arabic numerals 0 and 1–9 provides for television receiver channel selection when the system according to the invention is operating in the television program mode. Also, it may be used as a direct-action keypad for dialing out through the telephone network 14 when television receiver 8 is in the telephone two-way conversation with television picture mode. The MUTE control 30 provides for muting the television audio channel when the television receiver 8 is in the TV mode.

The PHONE control 32 when activated provides for initiating access to the telephone network 14. PHONE control 32 also provides for restoring the TV mode of operation when the system is in the TP mode.

PHONE control 32 comprises a first means and a second means for making electrical connections when switching from the TV mode to the TP mode, and vice-versa. The first means and second means activated by PHONE control 32 are indicated schematically in FIG. 1 as comprising ganged single-pole double-throw switches, the sections of which are designated as 32A and 32B. In lieu of mechanical switching means, the switching functions could as well be conducted by means of semiconductor devices in elementary logic circuit configurations. Function control means 15, and the controls having dual functions with relation to television system 10 and telephone network access means 12, are indicated as being a part of television system 10, although as noted, control means 15 may comprise a hand-held unit remote from the receiver cabinet and coupled to the television system 10 by wire, or alternately, by wireless means such as ultrasonic, infra-red, or radio-frequency coupling.

The discussion of the operation of standard television components and circuits, being very well-known in the art, is limited to functions in relation to components and circuits of the novel means according to the invention. The following description is presented in the sequence of the use of the television programming capability and the telephone two-way conversation capability according to the invention by the television receiver user.

When PHONE control 32 is in the TV mode, television receiver 8 provides for presentation of television programs. The composite video signal as broadcast is received through antenna 34. Alternately, the composite video signal may as well be received by cable means 35, as indicated. The television picture processing means 36 comprises the standard tuner, video IF amplifiers, video detector, luminance channel, sweep circuits, and in color receivers, the chrominance channel, all of which cooperate to activate a picture display 38 which normally comprises a cathode ray picture tube. The television audio signal processing means 40 provides for detecting the audio component of the composite signal following the video IF amplifier stage. The detected audio signal is amplified by audio amplifier means 42 which in turn drives speaker means 44. The combination of the audio amplifier means 42 and the speaker means 44 comprises an "audio amplifier-speaker means" having the dual purpose of providing audio for television programs and for the voice audio of a telephone caller when the receiver is in the during two-way conversations with-television-picture mode. Audio amplifier means 42 is shown as a separate block to indicate that the audio amplifier function is separately electrically accessible to a component of telephone network access means 12, as will be shown. As noted, when television receiver 8 is in the TV mode, television system 10 operation is normal.

While television receiver 8 is operating normally, access means 12 is monitoring telephone network 14 to detect a ringer signal, of one should occur. It will be noted that PHONE control 32, indicated schematically as comprising switch sections 32A and 32B, is shown as providing for operation in the TV mode. Upon occurrence of a ringer signal from telephone network 14, the signal is routed to the ring detector 45 of access means 12 which in turn is linked to the alerting signals generator 46. Alerting signals generator 46 provides for making the television receiver user aware of the presence of the ringer signal. The alerting signal may comprise by way of example, a visible signal routed through the picture signal processing means 36 for appearance on the picture display 38 as, for example, a flashing light. Also, the alerting signal may be an audible signal heard by way of the audio amplifier means 42 and speaker means 44. A further indication may comprise a flashing light on the television receiver. The indicator may be a light-emitting diode.

Reference is now made additionally to FIG. 3 which provides circuit details helpful to the implementation of the invention by one skilled in the art. The means described are by way of example and are not intended to be in any way limiting. Other ways of accomplishing the several functions will occur readily to those skilled in the art.

Ring detector 45 detects a ringer signal through the ring connection of tip and ring connection 16, and is shown as being in parallel connection with connection 16. The ring detector 45 may comprise a neon gas-discharge diode that will glow when excited by the approximately 90 volts, 20 Hz standard ringer signal of the telephone network 14. The glow of the diode can, by way of example, be detected and amplified by a light-sensitive photo-Darlington compound transistor. The output of the Darlington circuit can activate an audio oscillator which in turn activates speaker means 44 through audio amplifier means 42. Also, visual indication of the existence of the ringer signal can appear on the picture display 38 in the form of, for example, a flashing dot of light at the corner of the display. A simple character generator in operating conjunction with the picture processing means 36 would be required. As noted, the visual indication could as well be supplied by a light-emitting diode 48 mounted on the front panel 49, of the television cabinet, and driven by an astable multivibrator at a frequency of three pulses per second, for example.

Upon being alerted to the existence of the ringer signal, the television receiver user depresses PHONE switch 32 located on function control means 15. The center poles of switches 32A and 32B (the "first means" and "second means" described heretofore) are indicated by dash lines as making contact with the TP mode terminals of the switches. This is the "off-hook" condition which is sensed by an off-hook detector at the central office of the telephone network 14. The off-hook indicator comprises, in effect, a current drain that draws a small amount of current from the phone line; the existence of the current drain is detected by the central office of the telephone network as an indication that the line is in use. The drain, which may comprise a simple transistor circuit, is equivalent to a low impedance at DC, yet offers a very high impedance at AC frequencies, so that there is no attenuation of audio signals. When ganged switches 32A and 32B are in the TP mode, picture display 38 continues to receive the processed video signal for displaying a television picture according to the invention during the two-way telephone conversation.

The means for conducting a two-way conversation by way of the telephone network 14 through television system 10 having telephone network access means 12 according to the invention, as described in the following, is known as the "half-duplex" system. In the half-duplex system, the audio send channel means 60 (the "talk" mode) is disabled while the audio receive channel means 73 (the "listen" mode) is operating, and vice versa. Half-duplexing is required (although it is not mandatory as will be noted) because of the potential for regenerative acoustic feedback between the audio receive channel 73 and audio send channel 60. Microphone means 58 would normally be mounted on the front panel 49 of the television receiver cabinet along with speaker means 44, so feedback between the two would be highly likely. It should be noted that operation according to the principles of the invention could be accomplished by means of full duplexing; that is, the receive and send channel means could both be open at the same time to provide for a two-way telephone conversation. Special provisions are made in a full duplexing circuit to prevent feedback. For the purpose of this disclosure, however, the half-duplexing system is described by way of example.

Depending upon the type of half-duplexing system used, the audio receive channel 73 may be normally "on" except when the audio send channel 60 is in use. Alternately, the audio send channel 60 may be normally "on" except when the audio receive channel 73 is in use. A third mode is "locked out," in which one channel is completely off when the other channel is in use; in this case, the user of the locked out channel could not interrupt or otherwise gain control of the channel until the user of the channel had completed the communication.

The following functional circuit description is one in which the audio send channel means 60 is considered for purposes of example to be normally on. Upon receipt of a ringer signal, the television receiver user watching a television program will depress PHONE switch 32 on function control means 15, and greet the caller. The caller's response, heard via the audio amplifier-speaker means, will override the audio send channel 60 as the "listen" signal comes through the audio receive channel 73. The activation of either of the two states can be a function of upsetting the balance of a hybrid bridge circuit 54, for example, one branch of which is the primary of the transformer 56. The secondary of the transformer 56 is shown as being in series with the tip and ring circuit 16 of the telephone network 14.

The audio send channel means 60 consists of microphone means 58, a voice amplifier 62, a normally closed audio send switch 63A, a line amplifier 64, a send detector 78, and parts of other components as will be described. Microphone means 58, which provides for talking to a telephone caller, develops an audio voltage in response to the voice of the television receiver user. The signal is amplified by an amplifier 62 which may comprise a one or two-stage transistor circuit biased for class A operation. Audio send switch 63A, which may be a standard bipolar transistor or a junction field effect transistor, is biased by switch activator 82 so that switch 63A is normally conductive. Line amplifier 64 provides current gain sufficient to unbalance the hybrid bridge 54, and to modulate the telephone network circuit with voice signals through transformer 56, as indicated.

The audio receive channel means 73 may consist essentially of audio amplifier means 42 and speaker means 44, normally open audio receive switch 63B, receive detector 79, and parts of other components as will be described.

Bridge 54 is normally balanced, with the voltages at points 66 and 68 being equal. Point 68 is shown as being connected to the non-inverting input of difference amplifier 70, while point 72 of bridge 54 is connected to the inverting input of difference amplifier 70.

Half-duplexing channel selection is provided by send detector 78 and receive detector 79 in conjunction with signal comparator 80, an S-R ("send receive") control 81, and associated components. S-R control 81 provides for a determination of the priority of the two channels 60 and 73. Send detector 78 is essentially a peak or level detector which generates the absolute value of the amplified voice signal of the television receiver user. Receive detector 79 also functions as a peak or level detector and generates the absolute value of the "listen" signal of the telephone network 14. Comparator 80 compares the outputs of send detector 78 and receive detector 79. S-R control 81 determines whether the system should be in the send mode or the receive mode. When no signal is received from the telephone network, a bias is applied to comparator 80 to keep the audio send channel 60 active. As a result, audio send switch 63A remains closed and the audio send channel 60 remains operative.

The signal from the phone line at point 72 is amplified by amplifier 70 and is conducted through normally open receive switch 63B to the audio amplifier 42. Normally open audio receive switch 63B which may also, like audio send switch 63A, be a bipolar transistor or a JFET, will receive a bias signal from switch activator 82 and close, while audio send switch 63A will open in response to switch activator 82. The incoming telephone signal is amplified by amplifier 42 and is heard by the television receiver user through the dual-purpose audio amplifier-speaker means (42 and 44).

It is necessary in the mode described by way of example to sustain operation of the audio receive channel 73 to prevent switching over to the audio send channel 60 during intervals between syllables, or during brief pauses. This can be accomplished by providing relatively long circuit time constants which prevent undesired reversion to the audio send channel 60. Changing from the audio receive channel 73 to the audio send channel 60 will then occur only upon receipt of a positive signal from the audio send channel 60, or, in the "locked-out" mode described heretofore, only when there is no signal for a finite period on the audio receive channel. Block 83 indicates schematically another level detector which helps insure that the audio send channel 60 will operate the S-R control 81 during intervals between syllables or pauses occurring in the receive channel. This permits the user to switch the system into the send mode during intervals or pauses in the received conversation by talking and thereby activating the microphone 58.

The novel means according to the invention described in the foregoing provides "answer-only" capability; here follows a description of the option of dialing out by the television receiver user to initiate a two-way telephone conversation while viewing a television picture. With reference again to FIG. 2, the numerical keypad 26 of function control means 15, which as noted, may be mounted within the television receiver cabinet and/or hand-held, provides for direct-access dialing through dial signal generator means 84. Dial signal generator means 84 may be of the type that provides for dual-tone, multi-frequency dialing of the telephone network 14, or it may provide loop-disconnect dialing. To dial out, the television receiver user depresses the PHONE switch 32 on function control means 15 and the dial signal from the telephone network is heard through the dual-purpose audio amplifier-speaker means. The television audio input to audio amplifier means 42 is automatically muted in loop-disconnect dialing as the user dials a desired telephone number by means of keypad 26; muting is not required in dual-tone, multi-frequency dialing. The volume of the ensuing two-way telephone conversation may be adjusted by means of the standard volume regulator indicated schematically by potentiometer symbol 86 of the television system circuit. Upon termination of the two-way telephone conversation, the user of television receiver 8 can restore the television receiver program mode by reactivating PHONE switch 32. As with the TP mode described supra, the picture display continues to receive the processed video signal for displaying a television picture during an ensuing two-way conversation.

Other changes may be made in the above described apparatus without departing from the true spirit and scope of the invention herein involved, and it is intended that the subject matter in the above depiction shall be interpreted as illustrative and not in a limiting sense.

I claim:

1. A television receiver comprising a cabinet which houses a television system having telephone network access means, said receiver providing both for presentation of television programs and for conversing through the talk channel and listen channel of an embodied telephone network while viewing a television picture, said television system having function control means including operational mode selection means for providing a television program mode, and alternately, a two-way-telephone-conversation-with-television-picture mode, A. said television system of said television receiver comprising:
    (1) means for receiving broadcast or cable-carried television program signals;
    (2) means for processing said signals effective to provide separate video and audio signals;
    (3) cathode ray tube picture display means for receiving said video signal for displaying a television picture; and
    (4) television audio signal processing means for receiving said audio-signal including dual-function audio amplifier-speaker means connectible to said telephone network during to said two-way-conversation-with-television-picture mode;
  B. said telephone network access means of said television receiver comprising:
    (1) ring detector means for detecting a ringer signal from said telephone network during said television program mode;
    (2) alerting signal generating means for receiving said detected ringer signal and generating an audible and/or visible alerting signal;
    (3) off-hook signaling means for providing an off-hook signal to the telephone network;
    (4) microphone means for sensing user voice signals during a telephone conversation;

(5) audio send channel means for receiving and amplifying the output of said microphone means for routing to said talk channel of the telephone network; and (6) audio receive channel means for accepting the listen signal from said telephone network for routing to audio amplifier-speaker means in said television system;

C. said function control means of said television receiver comprising:

(1) first means for routing, when said receiver is in said television program mode, and when said receiver is in an ON-hook condition, said ringer signal from said telephone network to said ring detector and to said alerting signals generator, and for connecting said TV audio signal processing means to said audio amplifier-speaker means for reproducing the audio portion of the television program signal;

(2) second means for disconnecting the aforesaid connections for muting said television program when said function control means is operated to place the receiver in said two-way-telephone-conversation-with-television-picture mode, and when said telephone network is in an off-hook condition, said second means also providing for (a) connecting said audio receive channel means to said listen channel for accepting caller voice audio signals;

(b) connecting said audio receive channel means to said audio amplifier-speaker means for rendering audible the voice of said caller;

(c) connecting said audio send channel means to said talk channel for conducting the voice audio signals of said television receiver user to said caller; and, (d) connecting said off-hook signalling means to the telephone network for indicating the line is in use;

(3) volume regulating means for regulating volume of said audio amplifier-speaker means;

such that when the television receiver user is alerted to the presence of a detected ringer signal, the user can activate the two-way-telephone-conversation-with-television-picture mode and conduct a two-way conversation with said telephone caller through the television receiver while viewing a broadcast or cable-carried television picture, and upon termination of the conversation, restore said television program mode.

2. A television receiver comprising a cabinet which houses a television system having telephone network access means, said receiver providing both for presentation of television programs and for conversing through the talk channel and listen channel of an embodied telephone network while viewing a television picture, said television system having at least one function control means including operational mode selection means for providing a television program mode, and alternately, a two-way-telephone-conversation-with-television-picture mode, A. said television system of said television receiver comprising:

(1) means for receiving broadcast or cable-carried television program signals;

(2) means for processing said signals effective to provide separate video and audio signals;

(3) cathode ray tube picture display means for receiving said video signal for displaying a television picture; and (4) television audio signal processing means including dual-function audio amplifier-speaker means connectible to said telephone network during said two-way-conversation-with-television-picture mode;

B. said telephone network access means of said television receiver comprising:

(1) ring detector means for detecting a ringer signal from said telephone network during said television program mode;

(2) alerting signal generating means for receiving said detected ringer signal and generating an alerting signal;

(3) first means for receiving said alerting signal and providing an audible alerting signal through said audio amplifier-speaker means;

(4) second means for receiving said alerting signal including means for translating said signal into a flashing light on a panel of said receiver;

(5) off-hook signaling means for providing an off-hook signal to the telephone network;

(6) microphone means for sensing user voice signals during a telephone conversation;

(7) audio send channel means for receiving and amplifying the output of said microphone means for routing to said talk channel of the telephone network; and (8) audio receive channel means for accepting the listen signal from said telephone network for routing to audio amplifier-speaker means in said television system;

C. said function control means of said television receiver comprising:

(1) first means for routing, when said receiver is in said television program mode, and when said receiver is in an on-hook condition, said ring signal from said telephone network to said ringer detector and to said alerting signals generator, and for connecting said TV audio signal processing means to said audio amplifier-speaker means for reproducing the audio portion of the television program signal;

(2) second means for disconnecting the aforesaid connections for muting said television program when said function control means is operated to place the receiver in said two-way-telephone-conversation-with-television-picture mode, and when said telephone network is in an off-hook condition, said second means also providing for (a) connecting said audio receive channel means to said listen channel for accepting caller voice audio signals;

(b) connecting said audio receive channel means to said audio amplifier-speaker means for rendering audible said voice of said caller;

(c) connecting said audio send channel means to said talk channel for conducting the voice audio signals of said television receiver user to said caller; and, (d) connecting said off-hook signaling means to the telephone network for indicating the line is in use;

(3) volume regulating means for regulating the volume of said audio amplifier-speaker means;

such that when the television receiver user is alerted to the presence of a detected ringer signal, the user can activate the two-way-telephone-conversation-with-television-picture mode and conduct a two-way conversation with said telephone caller through the television receiver while viewing a broadcast or cable-carried television picture, and upon termination of the conversation, restores said television program mode.

* * * * *